July 3, 1962 J. M. EMBREE 3,041,822
NOZZLE CONTROL FOR TURBOJET ENGINE
Original Filed Dec. 8, 1955 4 Sheets-Sheet 1
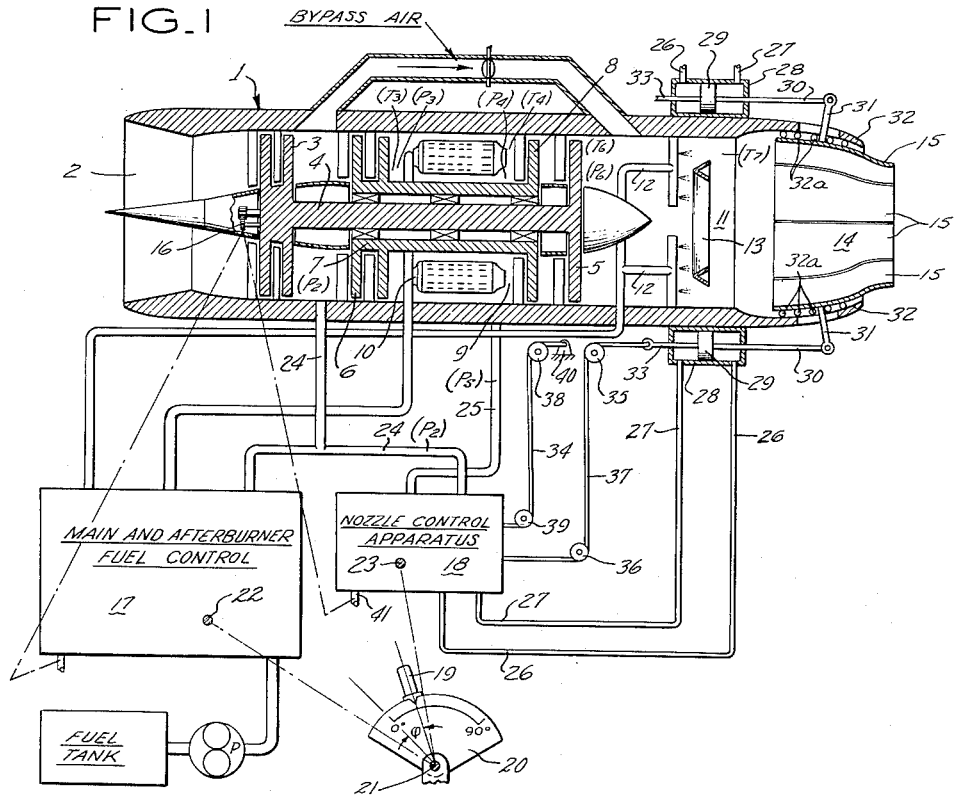
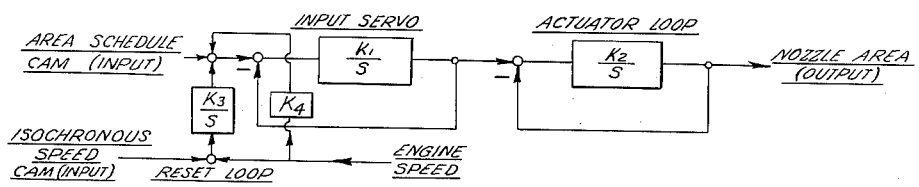
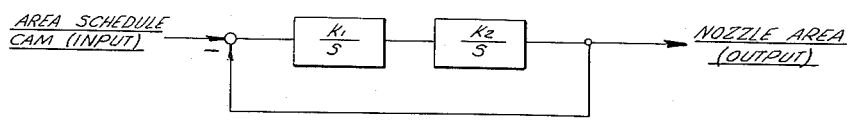
INVENTOR
JOHN M. EMBREE
BY *Arno Prentiss*
ATTORNEY July 3, 1962     J. M. EMBREE     3,041,822
NOZZLE CONTROL FOR TURBOJET ENGINE
Original Filed Dec. 8, 1955     4 Sheets-Sheet 2
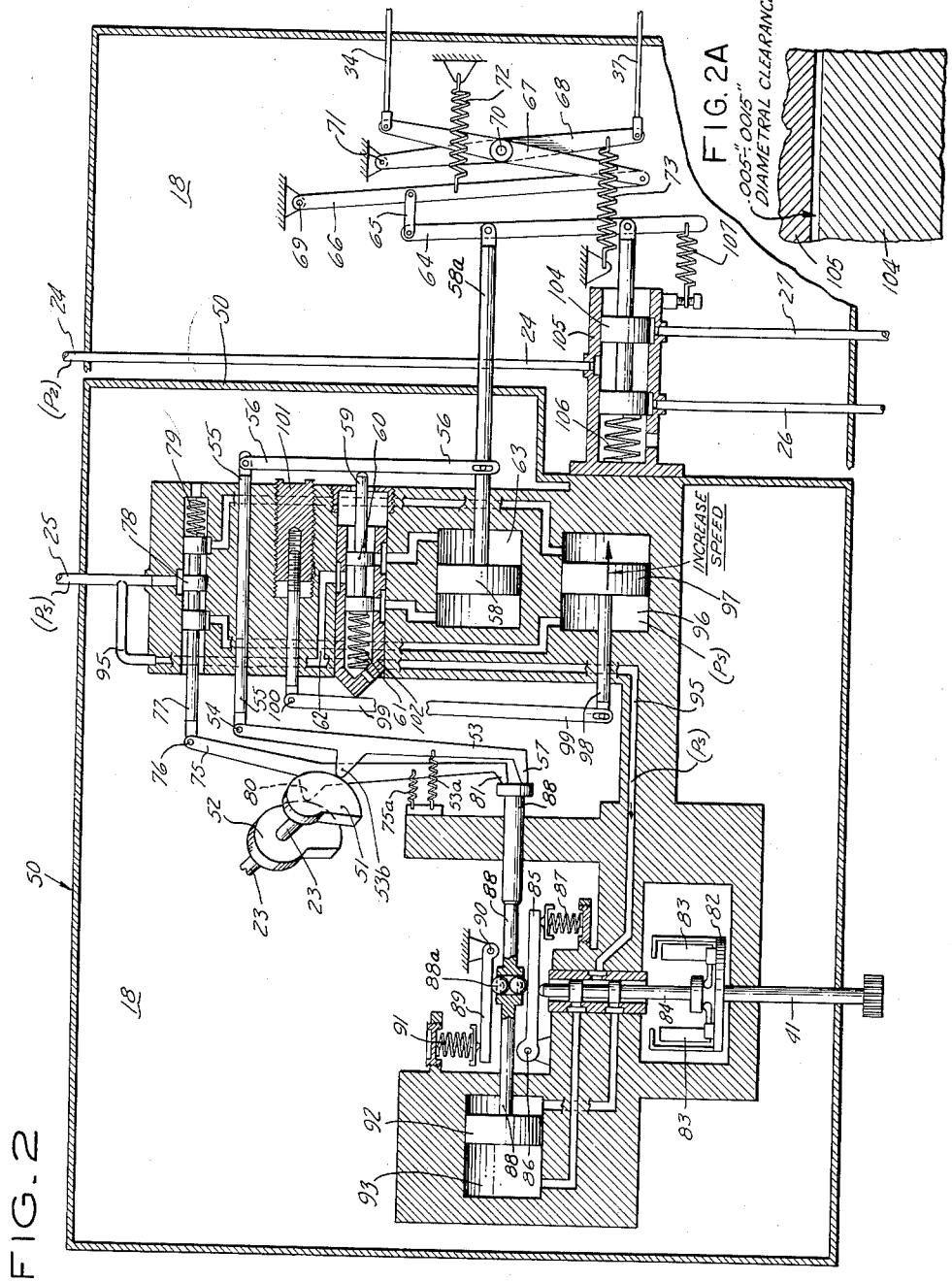
INVENTOR
JOHN M. EMBREE
BY *Am Prentiss*
ATTORNEY FIG_4
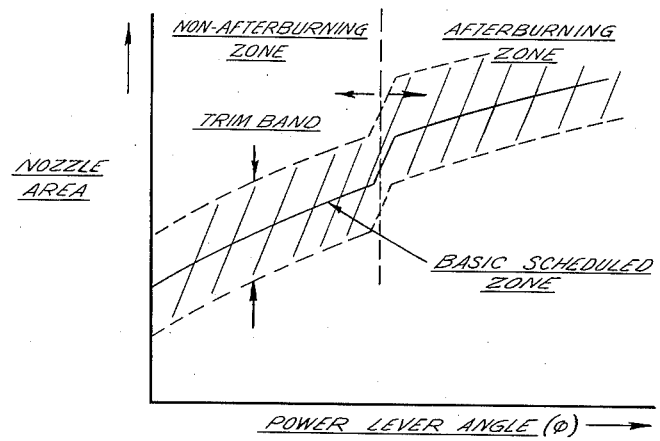
FIG_5
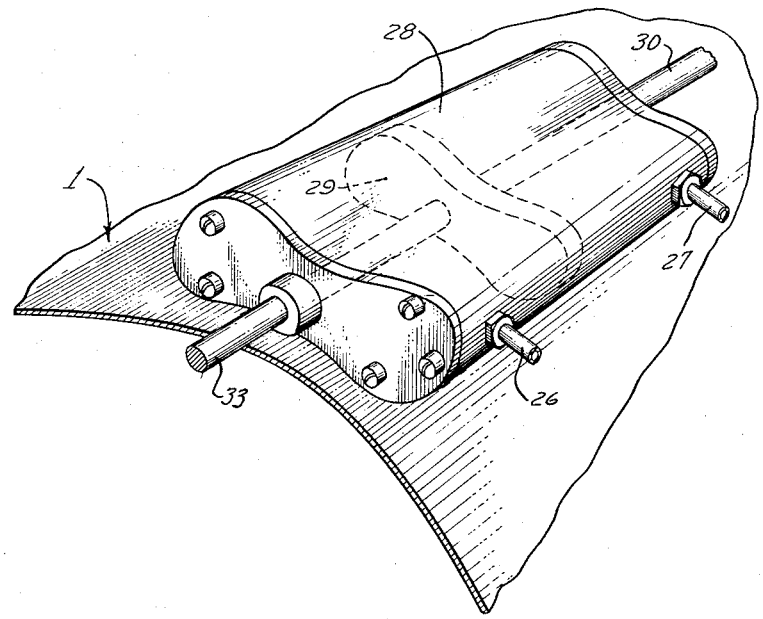
INVENTOR
JOHN M. EMBREE
BY
ATTORNEY July 3, 1962  J. M. EMBREE  3,041,822
NOZZLE CONTROL FOR TURBOJET ENGINE
Original Filed Dec. 8, 1955  4 Sheets-Sheet 4

INVENTOR
JOHN M. EMBREE
BY *[signature]*
ATTORNEY

United States Patent Office 3,041,822
Patented July 3, 1962

3,041,822
NOZZLE CONTROL FOR TURBOJET ENGINE
John M. Embree, Farmington, Conn., assignor, by mesne assignments, to Chandler-Evans Corporation, West Hartford, Conn., a corporation of Delaware
Continuation of application Ser. No. 551,824, Dec. 8, 1955. This application Apr. 21, 1960, Ser. No. 23,855
14 Claims. (Cl. 60—35.6)

This application is a continuation of my copending application, Serial No. 551,824, filed December 8, 1955, now abandoned, which covers my invention pertaining to speed and power control for turbojet engines, and more particularly relates to apparatus for controllably varying the area of the exhaust gas jet nozzle of a turbojet engine of the twin-spool type, wherein a high-pressure, and a low-pressure gas turbine rotor, each drives a separate air compressor.

Turbojet engines of the variable area jet type generally have either a balanced or an unbalanced exhaust nozzle. In the latter, the nozzle area is varied by baffles or flaps pivoted in such a way that the load of the impinging gases produces a large moment about the baffle pivots, and requires high actuating forces to move the baffles. On the other hand, in a balanced exhaust nozzle, the baffles are mounted in such a way that the exhaust gases impinge in opposing directions upon the opposite faces of the baffles, so that the net gas load thereon may be substantially reduced or even eliminated. Balanced exhaust nozzles preferably have baffles of a generally hemi-spherical shape, mounted on tracks around the perimeter of the nozzle, so that they overlap. Each baffle is made with a spherical contour, with the result that the gas force components are taken up by the track rollers. The tracks can be designed so that the net gas load tends to close the nozzle, to open the nozzle, or to keep the nozzle in the same position; in the last case the nozzle can be 100% balanced.

Because of the large forces (approximately 12 tons) required to actuate an unbalanced nozzle, the actuator mechanism is either too heavy or too slow to be satisfactory, and therefore a balanced nozzle is essential to a satisfactory, infinitely-variable, all-altitude jet nozzle area control system. Another very important advantage of the balanced over the unbalanced nozzle is that, whereas the former requires hydraulic power actuation, the latter may be satisfactorily actuated by relatively low-pressure pneumatic power.

The invention herein disclosed comprises a balanced, infinitely-variable, all altitude jet nozzle area control system, which utilizes engine compressor discharge pressure as its actuating power supply. Such pressure is always available, does not require any extra generating apparatus, and is as reliable as the engine itself. The system herein disclosed also incorporates the following salient features that are highly desirable in any exhaust nozzle area control, and constitute the principal objects of my invention.

(1) The time constant of the nozzle area control is as small as the time constant of the engine rotor to be controlled, and provides a very fast nozzle area control, including proportional action, and isochronous speed governing.

(2) The control provides adequate allowance for the factors involved in starting the engine, in the event of flameout while the aircraft is in flight; but it does not permit the nozzle area to open beyond a specified maximum area when afterburning is not in use, nor does it allow the area to close down too far while afterburning, since this would produce excessive temperatures and probable rupture of the afterburner liner.

(3) The area control is not affected by the thermal expansion and contraction of the engine under varying operating conditions, but accurately maintains the correct scheduled area at all times.

(4) The area control is inherently stable without elaborate compensating and damping means, such as auxiliary hydraulic shock-absorbers and stabilizers, which increase weight and complexity and reduce reliability.

(5) The area control is compatible with existing engine fuel control systems, to permit tying in to these controls and incorporation of the area control elements into the fuel control apparatus.

(6) The area control is of the minimum weight and takes up the minimum space. It also preferably utilizes space in a thin annular area around the exhaust diffuser section or afterburner nozzle, because (due to high temperature), this space is relatively unsuitable for other components and is more readily available.

With the foregoing and other objects in view, which may be incident to my improvements, my invention consists in the combination and arrangement of elements hereinafter described and illustrated in the accompanying drawings, in which:

FIGURE 1 shows diagrammatically, a turbojet engine of the two-spool type, equipped with afterburners and my improved control means for varying the exhaust gas nozzle; together with a fuel control apparatus, operating in conjunction with the exhaust gas nozzle control, and a manual control lever; with the principal connections thereinbetween;

FIGURE 2 shows diagrammatically the combination and arrangement of elements of my improved nozzle area varying and control apparatus;

FIGURE 2A is a fragmentary view, on an enlarged scale, of pneumatic servo valve and cylinder shown in FIGURE 2.

FIGURE 3A shows schematically the basically stable system of my invention, as compared with the basically unstable system characteristic of prior art exhaust nozzle area controls (FIGURE 3B);

FIGURE 4 is a diagram showing schematically certain features (trim band) of my improved control system;

FIGURE 5 is a perspective view of my preferred form of actuator cylinder and piston.

Figure 6:
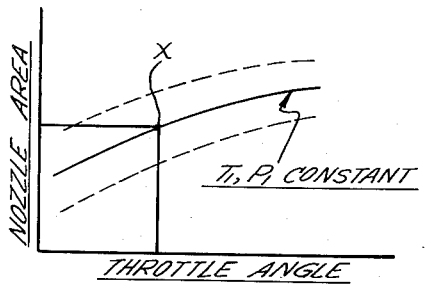

FIGURES 6–13, inclusive, are diagrams, showing the relations of factors governing the configurations of the principal control cams, as more particularly described.

Referring to FIGURE 1, there are shown as the principal elements of the engine referred to above: a supporting casing 1, having an air inlet 2, a low-pressure, multi-stage compressor 3, mounted on a shaft 4 and driven by a gas turbine 5; a high pressure, multi-stage compressor 6 mounted upon a shaft 7 and driven by a gas turbine 8; one of a number of main combustion chambers 9 and a series of main combustion nozzles 10; an afterburner combustion chamber 11, in which are located a series of afterburner nozzles 12 and flame baffles 13; a tailpipe 14 for discharging exhaust gases from turbine 5 through a nozzle whose flow area is varied by a plurality of adjustable flaps or baffles 15. Connected to the forward end of compressor shaft 4 is a gear train 16 for operating the speed-responsive elements of fuel control apparatus 17 and nozzle speed and power control apparatus 18. A pilot's manual control lever 19, movable over a graduated quadrant 20, is mounted on a shaft 21 which is connected to rotatable shafts 22 and 23, in fuel control 17 and nozzle control 18, respectively. A conduit 24 supplies compressed air, under the discharge pressure ($P_2$) of compressor 3, to nozzle control apparatus 18, which is also supplied, through a conduit 25, with liquid under a pressure ($P_s$) from any desired source, such as the engine lubricating system (not shown).

Nozzle area control 18 is connected by pipes 26 and 27 to a cylinder 28 in which is slidably mounted a piston 29, connected by a rod 30 and arm 31 to one of the baffles 15. Baffles 15 are mounted on tracks 32 by means of a series of interposed rollers 32a. The tracks 32 are so designed that the net load of the exhaust gases impinging on baffles 15 keeps them in the same position; that is, the nozzle baffles are nearly balanced as to the load exerted thereon by the exhaust gases. Piston 29 is also connected to a movable element in control 18 by a rod 33 and cable 37 which plays over pulleys 35 and 36. A second compensating cable 34, playing over pulleys 38 and 39, connects another movable element in control 18 with a fixed anchor 40 located adjacent cylinder 28, as will be described in further detail hereinbelow.

A drive shaft 41 of a speed-responsive device in control 18 is connected through gear train 16 to shaft 4 of compressor 3, so that said elements is rotated in constant ratio with the speed of said compressor.

Referring now to FIGURE 2, which shows, somewhat schematically, the combination and arrangement of elements constituting my improved exhaust nozzle area control (18 of FIGURE 1), the reference numeral 23 denotes a rocker shaft, which is rotatably mounted in casing 50 of nozzle area control 18, extends through the wall of said casing, and is connected to shaft 21 of manual control lever 19, so that shaft 23 is rotated with shaft 21 by the movement of lever 19 over quadrant 20. The angle $\phi$ through which lever 19 is moved (by the pilot) from its shut-off (0°) position is one of the control parameters of nozzle area control 18, and determines the speed and power output of the engine, under the existing operating conditions (e.g., circumambient air temperature and pressure).

Fixedly mounted on shaft 23 is a basic nozzle area schedule cam 51, and an isochronous speed ($N_L$) cam 52. A lever 53, pivoted at 54 to a reciprocable rod 55, has an integral finger 53b which contacts the contoured surface of cam 51, and terminates in a second finger 57 which is held in contact with the end of a slide rod 88 by a tension spring 53a. A link 56 is pivotally connected at one end to rod 55 and at its other end to a piston rod 58a attached to a piston 58, and bears against the end of a stem 59 of a pilot servo valve 60; hence, rotation of cam 51 in a counterclockwise direction moves lever 53, rod 55 and link 56 to the right, whereupon valve 60 also moves to the right of its neutral position (as shown in FIGURE 2) by virtue of a spring 61 which biases said valve in that direction. Conversely, a rotation of cam 51 in a clockwise direction moves valve 60 to the left.

The space between the lands of valve 60 is supplied through pipes 25 and 62 with liquid (e.g., oil) under a servo-pressure ($P_s$), so that when valve 60 moves to the right from its neutral position (as shown in FIGURE 2), liquid under pressure ($P_s$) enters the right end of cylinder 63 and moves piston 58 to the left, until valve 60 is restored to its neutral position by the corresponding movement of link 56 to the left with piston 58. Similarly, when valve 60 is moved to the left by clockwise rotation of cam 51, piston 58 is moved to the right. Rod 58a of piston 58 is pivotally attached to a differential linkage comprising links 64, 65, 66, 67 and 68, of which links 66, 67 and 68, are respectively pivoted at 69, 70 and 71. Link 66 is biased to the right by a tension spring 72, and link 68 is biased to the left by a tension spring 73. The lower end of link 68 is connected by cable 37 and rod 33 to piston 29; and the upper end of link 67 is similarly connected by cable 34 to a fixed anchorage 40, for the purpose described hereinbelow.

A lever 75, pivoted at 76 to stem 77 of a reset pilot valve 78, is biased to the left by a spring 79, has a finger 80 which contacts the contoured surface of cam 52, and terminates in a second finger 81 that is held in contact with the end of rod 88 by a tension spring 75a. A centrifugal speed governor 82, driven through shaft 41 and gears 16, by the rotor 4 of low-pressure compressor 3, has a pair of pivoted fly-weights 83, which move outwardly with increase in speed ($N_L$) of compressor 3 and lifts pilot valve 84, whose upper end bears against a lever 85, pivoted at 86. A spring 87 holds lever 85 in contact with a pair of balls 88a, which transmit the upward thrust of valve 84 by governor 82 to a lever 89, pivoted at 90, and biased in a downward direction by a spring 91, whereby the upward thrust of governor 82 on valve 84, and the upward force of spring 87, are balanced against the downward force of spring 91.

A piston 92, slidably mounted in a cylinder 93 drives the rod 88 which contains balls 88a in a cage integral with rod 88. The balls 88a are free to move only in the vertical direction. The space between the lands of valve 84 is supplied through pipes 25 and 95 with liquid under servo-pressure($P_s$); hence, when valve 84 is moved up from its neutral position (as in FIGURE 2), liquid under pressure ($P_s$) enters the left end of cylinder 93 and moves piston 92 to the right, until the downward force of spring 91 (acting with increased leverage on balls 88a, by reason of their movement closer to pivot 90) overcomes the upward thrust of governor 82 on valve 84(and the upward force of spring 87) and restores valve 84 to its neutral position. Conversely, a downward movement of valve 84, due to decreased speed of compressor 3 and governor 82, will admit liquid under pressure ($P_s$) into the right end of cylinder 93 and move piston 92 to the left, until valve 84 is restored to its neutral position by the reverse action of springs 91 and 87.

A movement of piston 92 to the right with increase in speed of compressor 3, as just described, moves rod 88 to the right, rotates levers 53 and 75, about their fingers 53b and 80, in a counterclockwise direction, and thus moves rod 55 and valve 78 to the left. This leftward movement of rod 55, through link 56, moves pilot valve 60 to the left and causes piston 58 to move to the right, until valve 60 is restored to its neutral position, as described above. At the same time, the leftward movement of valve 78, by the counterclockwise rotation of lever 75 about its finger 80, admits liquid under servo-pressure ($P_s$) to the left end of cylinder 96 and moves piston 97 to the right. The rod 98 of piston 97 is connected by a lever 99 to a movable pivot 100 whose position is adjusted by a threaded plug 101. A hollow valve sleeve 102, mounted on valve 60, bears against lever 99, by virtue of a spring 61 which biases sleeve 102 to the left. Hence, when lever 99 is swung to the right by the rightward movement of piston 97, as just described, sleeve 102 is also moved to the right, until the ports adjacent the lands of valve 60 are closed, whereupon piston 97 becomes stationary in its new position, as determined by the increased speed of compressor 3.

Lever 64 is pivotally connected near its lower end to a servo valve 104 which is slidably mounted in a sleeve 105, and is biased to the right by a spring 106, in opposition to a spring 107, which is attached to the lower end of lever 64 and biases it to the left. Sleeve 105 is connected by pipes 26 and 27 to the opposite ends of cylinder 28, and compressed air under the discharge pressure ($P_2$) of compressor 3, is admitted to sleeve 105 by pipe 24; hence, when the rightward movement of piston 58 (with piston 92), as described above, moves valve 104 to the right, compressed air, under pressure ($P_2$), is admitted to the left end of cylinder 28 and moves piston 29 to the right which moves baffles 15 toward nozzle 14 closing position. Conversely, when valve 104 is moved to the left by leftward movement of piston 58, baffles 15 are moved by piston 29 toward nozzle 14 opening position.

When piston 29 moves to the right, it pulls cable 37, levers 68, 67, 66 and the upper end of lever 64, to the right, which moves valve 104 to the left, until said valve is restored to its neutral position, whereupon piston 29 becomes stationary in its new position. Conversely, when piston 29 moves to the left, valve 104 is moved to the right until said valve is restored to its neutral position (as in FIGURE 2), whereupon piston 29 again becomes stationary in its new position.

A differential linkage 66—67—68 serves two purposes: primarily, it reduces the nozzle position feedback signal transmitted by cable 37 to a suitable magnitude; and secondarily, it introduces a compensation, by means of the expansion compensation cable 34, for thermal and gas load expansion of both the engine and the area feedback cable 37. Expansion of the engine because of thermal and gas load effects can be on the order of 1½ inches. By running the compensation and feedback cables 34 and 37 close together along the engine these thermal and load effects will have the minimum effect upon the control.

The contoured surfaces of cams 51 and 52 are determined by the lengths of the radii from various points on said surfaces to the center of rotation (23) of these cams.

As the throttle lever (19) (in FIG. 1) is rotated through an angle ($\phi$) which varies from zero (shut-off position) to about 90° (full-open position), the cams 51 and 52 are correspondingly rotated through an angle ($\phi$), in a counterclockwise direction. The difference between lengths of the radii from each cam surface to its center of rotation is called the cam rise, and measures the movement of nozzle flaps 15 (through the actuation of the servomechanism) by levers 53 and 75, in contact with cams 51 and 52, respectively.

Cam 51 is designed to produce a schedule of nozzle area ($A_2$) as a function of throttle angle ($\phi$); said function varying with compressor inlet conditions that effect engine speed, which in turn effects the nozzle area setting, since throttle angle and speed are both inputs to the control.

The basic problem in the design of cam 51 is to determine the relation between its cam rise and its angle of rotation ($\phi$), as the latter varies from zero to its maximum value.

For every value of throttle angle ($\phi$) there is a corresponding value of nozzle area ($A_n$) (as determined by the position of flaps 15), when the engine inlet temperature $T_1$ and pressure ($P_1$) remain constant, as shown by a point ($x$) in FIG. 6.

Figure 7:
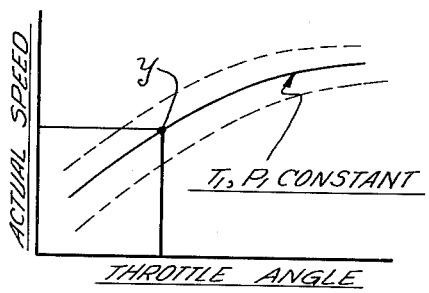
Figure 8:
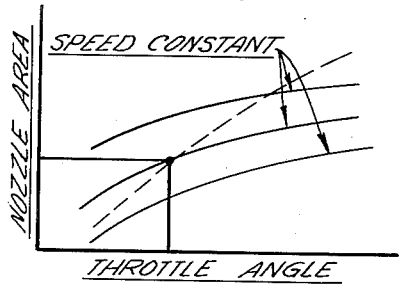
Figure 9:
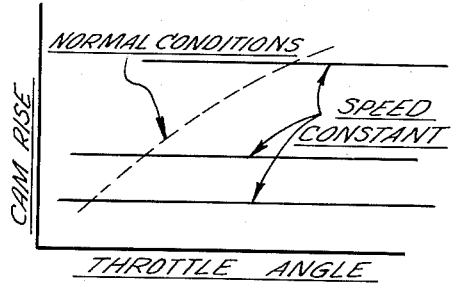

For every value of angle ($\phi$) there is a corresponding value of actual engine speed (N), as shown by the point ($y$) in FIG. 7. Since the values of nozzle area ($A_n$) are determined by the values of engine speed (N) and throttle angle ($\phi$), by combining the simultaneous values of points ($x$) and ($y$) in FIGS. 6 and 7, we obtain the relation between the values of nozzle area ($A_n$) and throttle angle ($\phi$), as shown by the dash line in FIG. 8. And since nozzle area ($A_n$) is determined by cam rise of cam 51, we obtain the relation between throttle angle ($\phi$) and cam rise of cam 51, as shown by the dash line in FIG. 9.

It is to be noted here that cam 51 establishes only the basic rough schedule of throttle angle versus nozzle area, to produce approximately the schedule of throttle angle versus speed as is ultimately required.

Figure 10:
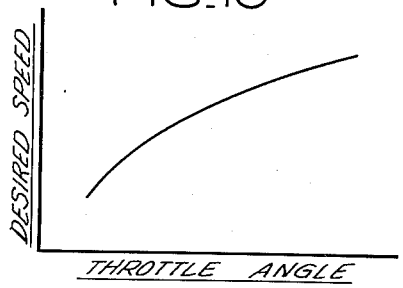

Cam 52. As previously noted, cam 51 produces an approximate schedule of throttle lever versus engine speed. To meet the requirement of a unique relationship of speed versus throttle angle position, cam 52 must correct the rough setting of cam 51. We start with the required relationship as shown by FIG. 10. At steady-state conditions, desire speed must equal actual speed.

Figure 11:
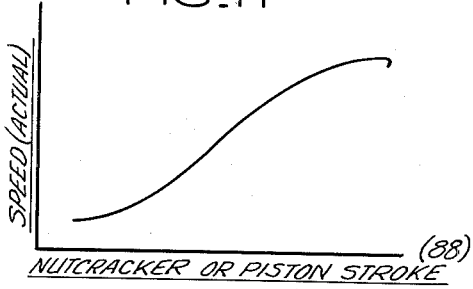

FIGURE 11 indicates the characteristic of the speed computer (88 strokes vs. speed). Cross plotting from FIGS. 10 and 11 we can get FIGURE 12, which establishes the required nutcracker stroke (88) as a function of throttle angle—which produces the required characteristic of FIGURE 10.

Figure 12:
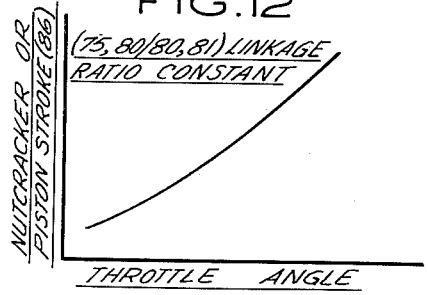
Figure 13:
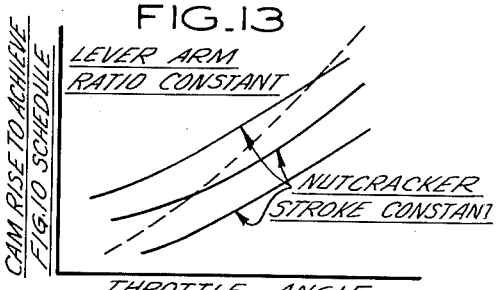

FIGURE 13 indicates the control characteristics of cam rise necessary to achieve the desired FIG. 10 schedule, in terms of various nutcracker (88) strokes. For the particular stroke characteristics, (as shown by FIG. 12) required, the specific required contour cam 52 may be determined from FIGURE 13, by plotting thereon nutcracker or piston (86) travel versus throttle angle (from FIG. 12). The schedules selected of course are dependent on particular engine characteristics. The shapes of the curves are general as indicated for the control and could change considerably depending upon the execution of a particular design within the control itself—lever arm ratios, flyweight sizes, spring loads, etc.

The system shown in FIGURE 2 meets all of the requirements for a desirable control as mentioned in columns 1 and 2 above. It contains a hydro-mechanical control section with inputs consisting of a manual position of shaft 23, and the engine speed rotation of shaft 41. The output of the hydro-mechanical control section is a position of shaft 58a proportional to the desired nozzle (14) area. This positions an air valve 104 supplying compressed air, under the discharge pressure ($P_2$) of the low pressure compressor 3, to a plurality of double-acting pneumatic actuators 29 which extend or retract the nozzle baffles 15 as they roll on rollers 32a along a track 32. For an infinitely variable-area jet nozzle as many as 24 baffles and 24 actuating pistons are used.

The feedback signal given by cable 37, attached to one or more of the baffles 15 and leading to a differential lever system 66—68, is designed to reduce the movement of valve 104, and also to compensate for thermal expansion of the engine. A compensating cable 34 is connected to the differential linkage 66—68 and is anchored to a stationary point 40, as far back as needed to provide adequate compensation.

As the area of nozzle 14 increases or decreases, the feedback cable 37 repositions the linkage 66—68 in the direction required to return the air valve 104 to the null position.

Since the actuator pistons 29 do not have perfect seals and continually leak air, the air valve 104 is made with a suitable diametral clearance (of from .005 to .0015 inch), to compensate for such leakage. The result is a proportional system which is inherently stable, which eliminates the instability of prior art pneumatic positional systems caused by the compressibility of the air.

In FIGURE 3 are shown the basically stable system of my invention (FIGURE 3A), as compared with the basically unstable system typical of prior art exhaust nozzle area controls (FIGURE 3B).

Examination of the block diagrams of FIGURES 3A and 3B shows why the control system herein disclosed is inherently stable. In FIGURE 3A, the first loop, with the $K_3/S$ block, represents the isochronous speed governor (83); the second loop, with the $K_1/S$ block, represents the input servo (60) which is essentially a single-time constant, hydraulic positional servomechanism. The third loop, with the $K_2/S$ block, represents the pneumatic actuator circuit (valve (104) and associated mechanism), where the $K_2/S$ block (in the forward loop) signifies that the position of the baffles (15), essentially the nozzle area, is proportional to the time integral of the valve (104) displacement. The presence of air leakage in valve (104) and coulomb friction in the baffles (15) means that some droop and hysteresis will exist in nozzle area. For this reason the isochronous governor (first loop) has been provided. This governor (83) is provided to reset the area scheduled on the area schedule cam to maintain constant, low pressure rotor speed. In order to prevent flameout or excessive nozzle temperatures, the control schedules a basic area (on cam 51) as a function of throttle lever position, and then causes the area to be varied from the basic schedule over a limited trim band.

The presence of air leakage and nozzle coulomb friction in baffles 15 means that some droop will exist in the nozzle position. For this reason, an auxiliary input (cam 52) is provided for in the input servo. This input is intended to reset the area scheduled on the area schedule cam (51) to provide an isochronous speed control, as shown by the reset loop of FIGURE 3A.

In order to prevent burner flameout or excessive nozzle (14) temperatures, the control schedules a basic area $(A_n)$ through cam (51) to be varied from the basic schedule over a limited proportional speed-governing band. This trim band is fixed by the geometry of the proportional speed-governing servo (52–60), and is shown schematically in FIGURE 4. This allows a proportion plus isochronous speed control to be used without permitting the nozzle 14 to open or close excessively.

This system can be tied in conveniently with existing fuel controls by building the hydraulic input servo (60) into either the main engine fuel control, or the afterburner fuel control and connecting the input cam 51 to the throttle (19). The space required for the differential linkage can be substantially reduced by wrapping said linkage around the engine casing (1) and the feedback and compensating cables 37 and 34 can run along the engine.

In order to minimize the diametrical space requirement for the actuating pistons 29 and cylinders 28, I have provided the kidney-shaped pistons and cylinders, as shown in FIGURE 5. Since piston leakage is desirable from the stability viewpoint, no elaborate seals are necessary.

*Operation*

In the system shown in FIGURE 2, a basic exhaust nozzle area schedule is provided by the rotation of cam 51 by speed and power control lever 19, and the scheduled isochronous speed in $(N_L)$ is provided by the rotation of cam 52 by control lever 19. Accordingly, the parameters for controlling the speed $(N_L)$, of compressor 3 (and turbine 5) are the angular position $(\phi)$ of lever 19, and the area $(A_n)$ of exhaust gas nozzle 14.

When the low pressure rotor speed $(N_L)$ is to be controlled by varying exhaust nozzle area $(A_n)$, a proportional or droop control alone will not control speed closely enough to maintain thrust to closer limits than can be obtained with a fixed nozzle area. The reason for this is that the high proportional gain required makes such control system unstable. In the system shown in FIGURE 2, this unsatisfactory condition is remedied by using integral control with proportional stabilization. A closed loop control is also required for nozzle positioning. The control system shown accomplishes the objective of close speed $(N_L)$ control with the required stability.

It is also essential to keep the nozzle area $(A_n)$ at the correct opening at all times to prevent burner flameout or excessive temperature. This is done by introducing a basic area $(A_n)$ schedule as a function of $(\phi)$, and permitting the speed control to vary area $(A_n)$ from this schedule only over a limited trim band.

Speed $(N_L)$ is computed by nutcracker-type computer 82—95, as shown in FIGURE 2. The speed computer piston 92 operates two differential levers 85 and 89; lever 75, against the isochronous speed cam 52; and lever 53, against the basic area schedule cam 51. Lever 53 provides a proportional translation of the area control shaft 58a with changes in $(N_L)$, by means of displacement type hydraulic servo 60, which has a pilot valve 60 with a movable sleeve 102.

Any small difference betwene the scheduled isochronous speed $(N_L)$ on cam 52 and the computed speed $(N_L)$, as measured by shaft 88, causes lever 75 to displace the reset valve 78 which ports fluid to the reset piston 97, causing it to move lever 99, and thus resetting the position of the movable pilot valve sleeve 102 until the speed error is eliminated. To prevent reset action during large changes in speed, the central land of valve 78 shuts off the fluid supply from pipe 25 when the speed offset exceeds a fixed small amount.

The area control shaft 58a operates against the differential linkage 66—68 in such a manner as to cause the air valve 104 to port air to the nozzle actuator pistons 29, until the change in nozzle position, (baffles 15), detected through the area feedback position cable 37, actuates the differential linkage 66—68 and returns the air valve 104 to the null position. This effects a closed loop control of the nozzle position (FIGURE 3), with a transfer function between the area control shaft 58a and nozzle 14 position, which approximates the form $$\frac{1}{1+T_s}$$

where T is the time constant.

Instead of actuating pistons 29 by compressed air, it is clear that said pistons may be actuated by hydraulic pressure. Thus, instead of supplying valve 104 with compressed air from compressor 3, pipe 24 can be connected to pipe 25, so as to supply liquid (e.g., oil) under pressure to valve 104 and pistons 29. However, for reasons stated in column 1 above, I prefer to use pneumatic pressure for actuating pistons 29, and particularly the discharge pressure $(P_2)$ of the low-pressure compressor 3.

While I have shown and described the preferred embodiment of my invention, I desire it to be understood that I do not limit myself to the particular combination and arrangement of elements disclosed by way of illustration, as these can be altered and changed by those skilled in the art without departing from the spirit of my invention or exceeding the scope of the appended claims.

I claim:

1. In a turbojet engine having an air compressor, a variable area exhaust gas nozzle, and a manually positionable engine speed and power control lever; a control apparatus comprising: first means, including a contoured schedule cam positioned by said lever, for varying the jet area of said nozzle, in relation to the position of said lever, in accordance with a preselected schedule therebetween, as determined by the contour of said cam; second means, responsive to the speed of said compressor, and including a contoured speed cam positioned by said lever, for always continuously modifying said schedule, within preset limits of said speed, in accordance with a preselected variable function of said compressor speed, as determined by the contour of said speed cam; said first and second means so coacting that said area is continously varied as a preselected composite function of said lever position and compressor speed such that said compressor speed has a different, preselected value for each position of said lever, throughout the speed and power operating range of said engine, as determined by the contours of said schedule and speed cams.

2. A control apparatus according to claim 1 wherein said first means includes a plurality of positionable baffles, which are dynamically balanced with respect to the impingement thereon of said exhaust gas, and which vary said area in accordance with their position, as determined by the joint action of said first and second means.

3. A control apparatus according to claim 2 wherein said first means includes a movable actuator for positioning said baffles which is motivated by a compressible fluid under pressure from said engine, an actuator valve for controlling the flow of said fluid to and from actuator, a first power piston, motivated by a liquid under pressure from said engine, for positioning said actuator valve, and a servo-valve means for controlling the application of said liquid to said piston.

4. A control apparatus according to claim 3, wherein said actuator valve and said piston are connected to said actuator by a differential feedback linkage.

5. A control apparatus according to claim 4, wherein said second means includes a second power piston, motivated by liquid under pressure from said engine, for resetting said servo-valve means, and a reset valve, actuated by said governor, for controlling the position of said piston.

6. A control apparatus according to claim 5, wherein said servo-valve means comprises a spool valve actuated by said first means and an operatively associated sleeve valve actuated by said second means.

7. A control apparatus according to claim 6, wherein said servo-valve means includes manual means for adjusting the position of said sleeve valve, in relation to the corresponding position of said second power piston, so as to adjust the relation of said nozzle area to the position of said control lever.

8. A control apparatus according to claim 1, wherein said schedule cam and said speed cam are fixed to a rotatable common shaft, which is connected to said manual control lever, so that shaft and cams are rotated in proportion to the change of position of said lever.

9. A control apparatus according to claim 1, having means, coacting with said first and second means, for compensating the action of said first and second means, in varying the area of said nozzle, for expansion and contraction of said engine due to changes in engine temperature, whereby said area is not affected by said engine expansion and contraction.

10. In a turbojet engine having two aligned gas turbines, one driving a first high-pressure air compressor and the other driving a second low-pressure air compressor, a variable area exhaust gas nozzle, and a manually positionable engine speed and power control lever; a control apparatus comprising: first means for varying the jet area of said nozzle, in relation to the position of said lever, in accordance with a preselected schedule therebetween; second means, responsive to the speed of said second compressor, for modifying said schedule in accordance with said second compressor speed, whereby said area is a composite function of said lever position and compressor speed such that said second compressor speed has a different, preselected value for each position of said lever, throughout the speed and power operating range of said engine; said first means including a plurality of positionable baffles, which are dynamically balanced with respect to the impingement thereon of said exhaust gas, and which vary said area in accordance with their position, as determined by the joint action of said first and second means; said first means also including a movable actuator for positioning said baffles which is motivated by a compressible fluid under pressure from said engine, an actuator valve for controlling the flow of said fluid to and from said actuator, a first power piston, motivated by a liquid under pressure from said engine, for positioning said actuator valve, and a servo-valve means for controlling the application of said liquid to said piston; said actuator valve and said piston being connected to said actuator by a differential feedback linkage; and said second means including a second power piston, motivated by liquid under pressure from said engine, for resetting said servo-valve means, and a reset valve, actuated by said governor, for controlling the position of said piston.

11. A control apparatus according to claim 10, wherein said servo-valve means comprises a spool valve actuated by said first means and an operatively associated sleeve valve actuated by said second means.

12. A control apparatus according to claim 11, wherein said servo-valve means includes manual means for adjusting the position of said sleeve valve, in relation to the corresponding position of said second power piston, so as to adjust the relation of said nozzle area to the position of said control lever.

13. A control apparatus according to claim 10, wherein said first means includes a cam for varying said jet area in relation to the position of said lever, in accordance with a preselected schedule, said second means includes a cam for modifying said schedule in accordance with said second compressor speed, and said schedule cam and said speed cam are fixed to a rotatable common shaft, which is connected to said manual control lever, so that said shaft and cams are rotated in proportion to the change of position of said lever.

14. A control apparatus according to claim 10, having means, coacting with said first and second means, for compensating the action of said first and second means, in varying the area of said nozzle, for expansion and contraction of said engine due to changes in engine temperature, whereby said area is not affected by said engine expansion and contraction of said engine due to changes in engine temperature.

References Cited in the file of this patent

UNITED STATES PATENTS

| | | |
|---|---|---|
| 526,930 | Maxon | Oct. 2, 1894 |
| 1,933,311 | Caughey | Oct. 31, 1933 |
| 2,378,558 | Kalin | June 19, 1945 |
| 2,743,897 | Elliott et al. | May 1, 1956 |
| 2,778,191 | Thompson | Jan. 22, 1957 |
| 2,780,054 | Coar et al. | Feb. 5, 1957 |
| 2,801,516 | Battle | Aug. 6, 1957 |
| 2,820,340 | Dolza | Jan. 21, 1958 |
| 2,873,576 | Lombard | Feb. 17, 1959 |
| 2,896,652 | Goetsch et al. | July 28, 1959 |
| 2,924,933 | Grube | Feb. 16, 1960 |
| 2,924,934 | Rainbow | Feb. 16, 1960 |
| 2,934,888 | Petry | May 3, 1960 |